United States Patent

Tokuume et al.

Patent Number: 5,101,349
Date of Patent: Mar. 31, 1992

[54] NATURAL LANGUAGE PROCESSING SYSTEM

[75] Inventors: Yoshihiro Tokuume, Machida; Shogo Shibata, Tokyo; Koichi Masegi, Machida, all of Japan

[73] Assignee: Canon Kabushiki Kaisha, Tokyo, Japan

[21] Appl. No.: 491,811

[22] Filed: Mar. 12, 1990

[30] Foreign Application Priority Data

Mar. 14, 1989 [JP] Japan ................................. 1-63253

[51] Int. Cl.$^5$ ............................................ G06F 15/38
[52] U.S. Cl. ................................................. 364/419
[58] Field of Search ................ 364/419, 900 MS File, 364/200 MS File

[56] References Cited

U.S. PATENT DOCUMENTS

| | | | |
|---|---|---|---|
| 4,641,264 | 2/1987 | Nitta et al. | 364/419 |
| 4,868,750 | 9/1989 | Kucera et al. | 364/419 |
| 4,914,590 | 4/1990 | Loatman et al. | 364/200 |
| 4,942,526 | 7/1990 | Okajima | 364/419 |

FOREIGN PATENT DOCUMENTS 63-136260  6/1988  Japan .

OTHER PUBLICATIONS

"Machine Translation System for Multi-Language Using Common Sense, Which Utilizes Concept Structure Independent of Language as Intermediate Structure", in Nikkei Electronics, Dec. 17, 1984, by Uchida.
An Introduction to Unification-Based Approaches to Grammar, pp 11-36, by Schieber.
Fundamental Technique of Natural Language Processing, chapter 6, ("Unification Grammar"), by Nomura.
"Generation of English Sentence From Conceptually Dependent Diagram", 5L-3, 285h National Meeting of the Institute of Electronics, Information and Communication Engineers of Japan, 1984, by Kaji et al.

*Primary Examiner*—Dale M. Shaw
*Assistant Examiner*—Xuong M. Chung
*Attorney, Agent, or Firm*—Fitzpatrick, Cella, Harper & Scinto

[57] ABSTRACT

A natural language arrangement includes stored grammatical rules each having a phrase structure part representing grammatical functions, a semantic part representing the manner of propagation from a superordinate category to a subordinate category, a condition part, and a message part that imposes limitations on a phrase structure rule using the subordinate category as a superordinate category. The grammatical rules are searched and interpreted to generate a phrase structure for a sentence from grammatical function information obtained by interpreting and applying the searched grammatical rules.

14 Claims, 13 Drawing Sheets

FIG. 4 (PRIOR ART)

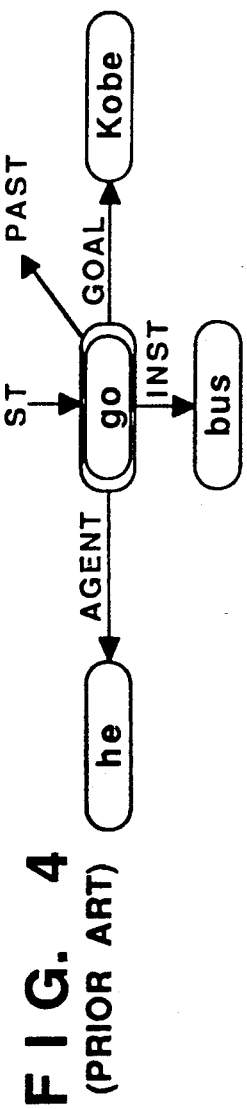

FIG. 5 (PRIOR ART)

| No. | <CONDITION> | <ARCNAME> | <ACTION> | <MESSAGE> |
|---|---|---|---|---|
| [ INTRANSITIVE VERB (VI) ] | | | | |
| (1) | * | AGENT | OUT ARC | SUBJ (SUBJECT) |
| (2) | NO SUBJECT | OBJ | OUT ARC | SUBJ (SUBJECT) |
| (3) | AUXILIARY VERB | * | AUXILIARY VERB OUTPUT | * |
| (4) | PERFECT TENSE | * | PERFECT FORM OUTPUT | * |
| (5) | PAST TENSE | * | PAST FORM OUTPUT | * |
| (6) | PRESENT TENSE | * | PRESENT FORM OUTPUT | * |
| (7) | OBJECT & TRANSITIVE VERB | OBJ | OUT ARC | OBJ (OBJECT) |
| (8) | INDIRECT OBJECT NEEDED | GOAL | OUT ARC | GOAL (GOAL) |
| (9) | * | INST | OUT ART | MOD (MODIFIER) |
| (10) | NON-INTERROGATIVE SENTENCE | * | PERIOD (.) OUTPUT | * |
| (11) | INTERROGATIVE SENTENCE | * | "?" OUTPUT | * |
| [ PRONOMINAL SUBJECTIVE CASE (PS) ] | | | | |
| (1) | OBJ | * | WORD CHANGE | * |
| (2) | GOAL | * | WORD CHANGE | * |
| (3) | POSS | * | WORD CHANGE | * |
| (4) | PLURAL, SINGULAR | * | WORD CHANGE | * |
| (5) | * | * | OUTPUT ONESELF | * |

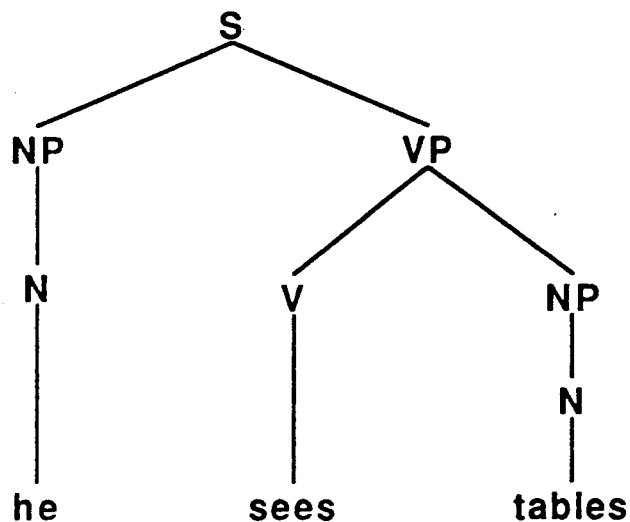

FIG. 6B $$\begin{bmatrix} \text{SUBJ} & \begin{bmatrix} \text{NUM} & \text{SG} \\ \text{PERS} & 3 \\ \text{GEN} & \text{MASC} \\ \text{CASE} & \text{NOM} \\ \text{PRED} & \text{'HE'} \end{bmatrix} \\ \text{TENSE} & \text{PRES} \\ \text{PRED} & \text{'SEES} \langle(\text{SUBJ})(\text{OBJ})\rangle\text{'} \\ \text{OBJ} & \begin{bmatrix} \text{NUM} & \text{PL} \\ \text{PRED} & \text{'TABLE'} \end{bmatrix} \end{bmatrix}$$

FIG. 6C

LR1) : S → NP VP (↑ SUBJ ) = ↓   ↑ = ↓

LR2) : VP → V   (NP)           (PP)

(↑ OBJ) = ↓   (↑ (↓ PCASE)) = ↓

LR3) : VP → V   (NP)      (NP)           (PP*)

(↑ OBJ) = ↓  (↑ OBJ2) = ↓  (↑ ADJUNCT) = ↓

LR4) : NP → NP       (PP*)

↑ = ↓   (↑ ADJUNCT) = ↓

LR5) : NP → (D)    (A)    N

LR6) : PP → P    NP (↑ OBJ) = ↓

F I G. 7

LD1) : sees : V  (↑ TENSE) = PRES (↑ SUBJ NUM) = SG (↑ SUBJ PERS) = 3

(↑ PRED) = 'SEES < (↑ SUBJ) (↑ OBJ) >'

LD2) : he : N  (↑ NUM ) = SG (↑ PERS) = 3

(↑ GEN ) = MASC (↑ CASE) = NOM (↑ PRED) = HE

LD3) : tables : N  (↑ NUM) = PL (↑ PRED) = 'TABLES'

F I G.  8

```
[ head  [ lex be        ]
        [ syn Wv1 L1    ]
        [ tense pres    ]
  subcat [ SUB [ head [1] [ lex boy   ]
                           [ sem H    ]
                           [ case OBJ ]
                rel [ relpro [ head [1] ]
                      head [ lex see    ]
                           [ syn T1     ]
                           [ tense past ]
                      subcat [ SUB [ head [ lex I     ]
                                          [ sem H    ]
                                          [ case AGT ]]
                               OBJ [ head [1]  ]
                                   [ slash  +  ]]]]
         PRE [ head [ lex John ]
                    [ sem H    ]
                    [ case PRE ]]]
]
```

R1. bun → SDEC END
@ sem ↑ = SDEC

R2. SDEC → NP BEP PRED
@ sem (↑ subcat SUB) = NP
(↑ head) = BEP
(↑ subcat PRE) = PRED
@ con (↑ head syn) = = Wv1
@ mes (NP rel) → NP + + SREL R3. SDEC → NP VP
@ sem (↑ subcat SUB) = NP
↑ − (↑ subcat SUB) = VP
@ con (↑ head syn) ≠ Wv1
@ mes (NP rel) → NP + + SREL R4. NP → DDET NOMHD SREL/NP
@ sem (↑ head) = NOMHD
(↑ rel) = SREL
@ con mes = = SREL R5. SREL/NP → RELPRO SDEC
@ sem (↑ relpro) = RELPRO
↑ − (↑ relpro) = SDEC R6. VP → V NP
@ sem (↑ head) = V
(↑ subcat OBJ) = NP
@ con (↑ head syn) = =T1

F I G.   12

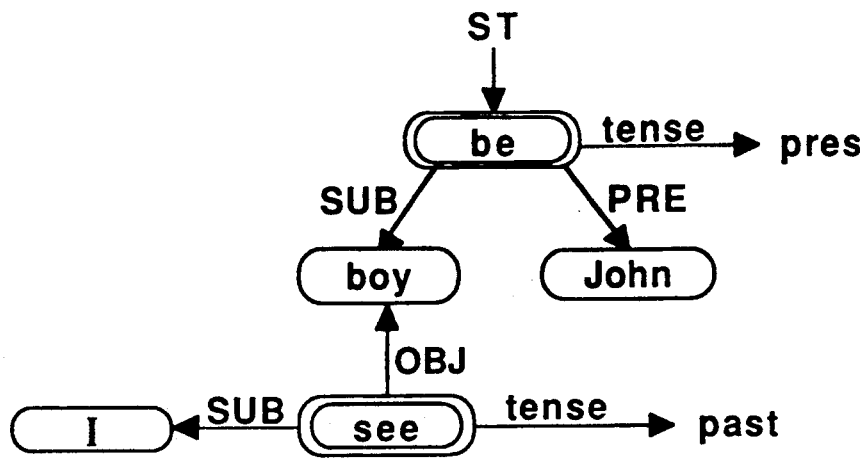
F I G. 13
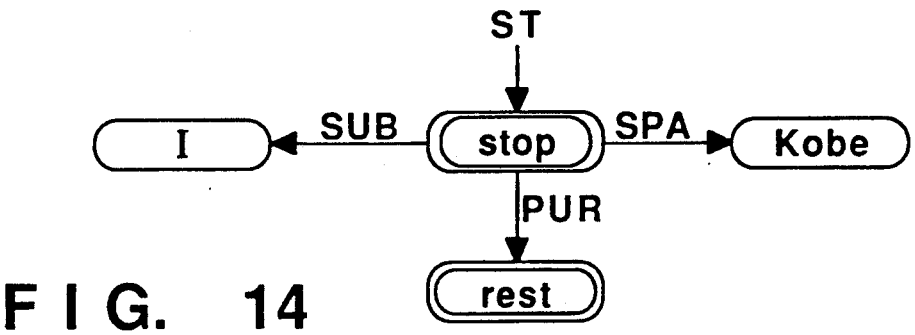
F I G. 14
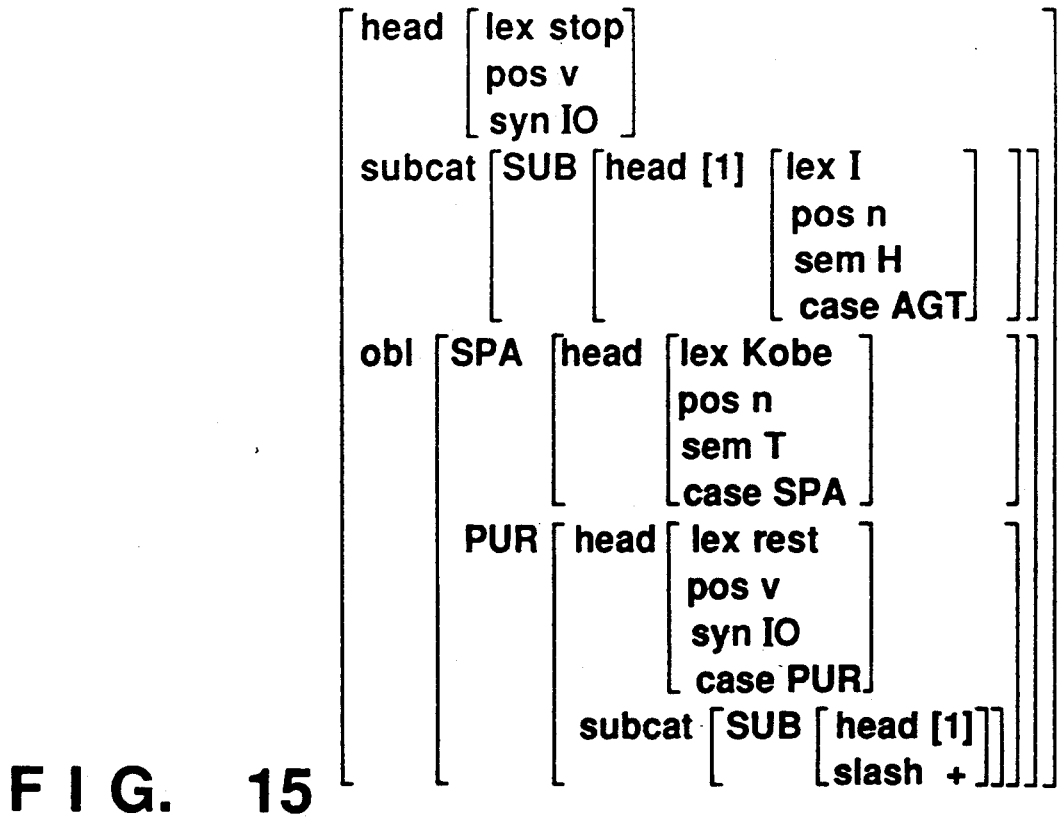
F I G. 15

R1. SDEC → NP VP
   @ sem (↑ subcat SUB) = NP
         ↑ − ( ↑ subcat SUB) = VP
   @ con (↑ head syn) ≠ Wv1
   @ mes (NPrel) → NP + + SREL
         VP obl PUR head pos) = = v → VP + + INF R2. VP → VP INF
   @ sem ↑ −(↑ obl PUR ) = VP
         (↑ obl PUR) = INF
   @ con mes = = INF
   @ mes (VP obl) → VP + + PP R3. VP → VP PP
   @ sem ↑ − (↑ obl*x) = VP
         (↑ obl*x) = PP
   @ con mes = = PP
   @ mes (VP obl) → VP + + PP

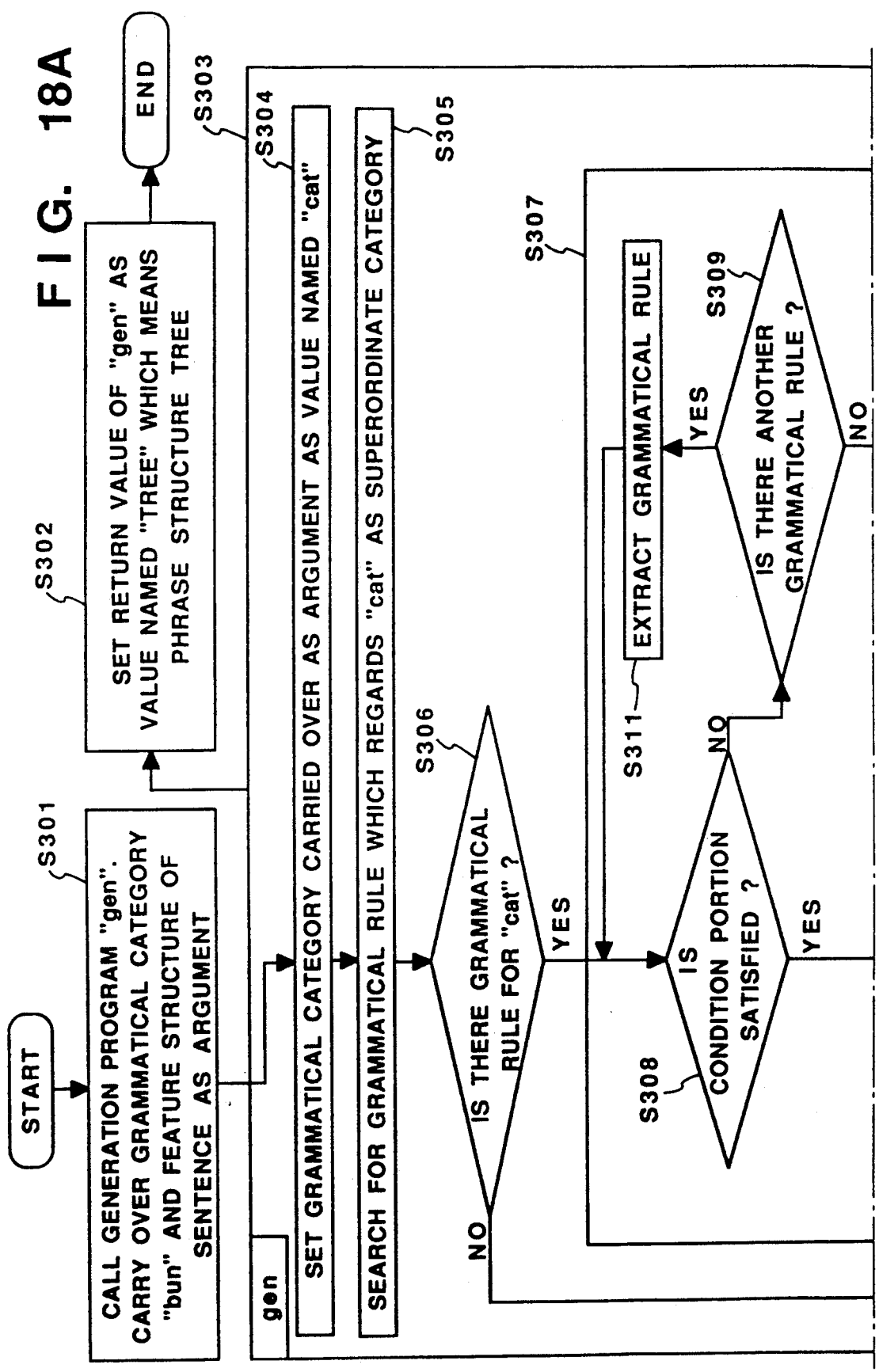

NATURAL LANGUAGE PROCESSING SYSTEM

BACKGROUND OF THE INVENTION

1. Field of the Invention

The present invention relates to a natural language processing system and, more particularly, to a sentence structure generating device for use in a machine translation apparatus or the like.

2. Description of the Related Art

In the field of natural language processing systems which provide natural language outputs in response to natural language inputs, various types of translation systems have been proposed, such as a machine translation system for translation, for example, from Japanese into English and an interactive response system arranged to receive a question in English or Japanese and output an answer in English or Japanese. In such a system, first of all, an input Japanese (or English) sentence is analyzed and the conceptual structure (semantic structure) of the Japanese (or English) sentence is determined. The conceptual structure is in general expressed as a semantic network which comprises nodes representing individual concepts and arcs representing the relationships between the concepts. The Japanese (or English) concept which has been obtained from the analysis of the Japanese (or English) sentence, is transferred to a corresponding Japanese (or English) conceptual structure in order to compensate for the difference between the structures of the Japanese and English languages. Translation into the corresponding English (or Japanese) sentence is achieved on the basis of the conceptual structure of the English (or Japanese) language. The present invention pertains to the above-described process which is generally called "generation of a sentence structure".

Referring to FIG. 2, which is a block diagram showing the general arrangement of a conventional machine translation system, a technical field related to the present invention will be explained below in further detail. In FIG. 2, an input sentence is denoted by S21. A morpheme analysis device 21 divides the input sentence S21 into a plurality of morphemes. In general, the morpheme analysis device 21 is required to process an agglutinative language, such as Japanese, in which no clear division is present between words which constitute a sentence, but it is not needed with respect to an inflectional language, such as English, in which clear divisions are present between words. The input sentence S21 is subjected to an morpheme analysis in the morpheme analysis device 21 and delivered as a word string S22. A sentence-structure analysis device 22 analyses the grammatical structure of the word string S22.

The analysis of the sentence structure of the word strings S22 results in a phrase structure tree S23. A semantic analysis device 23 performs an analysis at a semantic level on the basis of the phrase structure tree S23. The semantic analysis device 23 outputs a semantic structure S24 as the result of its semantic analysis. A transfer device 24 receives the semantic structure S24 of the input language (e.g., Japanese) analyzed by the semantic analysis device 23 and transfers it to the semantic structure S25 of the desired language (e.g., English). A sentence structure generating device 25 generates a phrase structure tree S26 from the semantic structure S25 of the desired language. A morpheme generating device 26 generates a translated sentence S27.

It has also been proposed to provide a conventional machine translation system including a generation system which is not separated into the sentence structure generating device 25 and the morpheme generating device 26 unlike the above-described translation apparatus. Such a machine translation system generates the translated sentence S27 directly from the semantic structure S24 without generating the phrase structure tree S26.

FIG. 3 shows in schematic form the display screen of a display (CRT) device (not shown) which is connected to the conventional translation apparatus shown in FIG. 2. The illustrated display screen displays six windows. The six windows display the input sentence S21, the phrase structure tree S23 of the input sentence S21, the semantic structure S24 of the input sentence S21, the semantic structure S25 of the desired language, the phrase structure tree S26 of the desired language, and the output translated sentence S27, respectively, in accordance with the sequence explained with reference to FIG. 2.

The natural language sentence generating device according to the present invention relates to, for example, a sentence structure generating device such as the sentence structure generating device 25 of FIG. 2.

In the field of natural language sentence generating device which are associated with the present invention, conventional sentence structure generating devices have been designed to generate translated sentences as explained in, for example, Nikkei Electronics, Dec. 17, 1984, "Machine Translation System for Multi Language Using Common Sense, Which Utilizes Concept Structure Independent of Language as Intermediate Structure", and Japanese Patent Laid-Open No. 63/136260. Such a conventional sentence structure generating device is arranged to search a dictionary by referring to node names (hereinafter referred to as "words") as key words while following a conceptual structure such as a semantic network, and then to activate sentence generation rules associated with the words on the basis of the result of the search, thereby generating a translated sentence.

The dictionary used in such a conventional sentence structure generating device stores generation symbols some of which indicate the groups of generation rules associated with the words of interest. The generation symbols serve as pointers indicating the groups of generation rules related to the words. The "generation rule" may be regarded as a production rule for providing a word string by examining each of the nodes and arcs present in a semantic network. As shown in FIG. 5, the generation rules may be carefully classified and prepared for each part of speech such as noun, intransitive verb, transitive verb, pronominal objective case and so on. Each group of generation rules includes a plurality of generation rules. The sequence of applying the generation rules is determined in advance so that it determines the order of words.

The following is an explanation of the process of generating the English sentence "He went to Kobe by bus." from the semantic network shown in FIG. 4 by means of the above-described conventional sentence structure generating system. In the semantic network of FIG. 4, the node represented by a double circle indicates that the word "go" is a predicate. Arcs, which have the arc names "AGENT", "GOAL", and "INST", represent deep case relations such as an agentive case, a goal and an instrument, respectively. An arc "PAST" indicates past tense and an arc ST indicates a predicative word which serves as the primary word in the sentence.

FIG. 5 shows an example of a dictionary provided with the generation rules used in the conventional generation system. In the dictionary shown in FIG. 5, "*" means that (1) if "*" is used in a condition field, it indicates that no condition is specified; (2) if "*" is used in an arc name field, it indicates that no arc name is specified; and (3) if "*" is used in a message field, it indicates that there is no message to be output.

Referring to the semantic network of FIG. 4, the process of sentence generation starts with the node "go" to which the arc "ST" extends. A rule interpreter for interpreting the generation rules examines the generation rules associated with "go" one by one. In this case, the generation symbol of "go" indicates "VI", which means that the generation rules of an intransitive verb (VI) are applied in the ascending order from the rule (1) shown in the table "INTRANSITIVE VERB (VI)" of FIG. 5. Thus, the first rule (1) associated with the intransitive verb is applied. The action which is assigned to the rule (1) is "out arc". The term "out arc" means an arc which extends out of the corresponding node. If the action is "out arc", the corresponding arc name indicates the type of the node pointed by the arc. In the rule (1), the type is "AGENT". The message attached to the illustrated node is "SUBJ". Accordingly, the rule (1) will regard as AGENT the node pointed by the out arc and will generate the AGENT as a subject. Then, the process proceeds to a sub-network starting with the out arc AGENT. At this time, a message representing "SUBJ (subject)" is sent to the node "he".

To process the sub-network starting with AGENT, the process proceeds to the node "he". At this time, a flag indicating that the node "go" is being processed is set up. Then, since the generation symbol of "he" is PS (pronominal subjective case), the portion "PRONOMINAL SUBJECTIVE CASE (PS)" of the dictionary of FIG. 5 will be searched so that the generation rules of the pronominal subjective case (PS) will be applied to the processing of the node "he". As described above, the message "SUBJ (subject)" has already been sent to the node "he", and it is checked whether or not this message corresponds to each condition located in the condition field of each rule in the dictionary. In this case, the message "SUBJ (subject)" matches the condition of the rule (5) other than the rules (1) to (4). Accordingly, as shown as "OUTPUT ONESELF" in the column "ACTION" of the generation rule (5), the word "he" itself is output.

The generation rule (5) of FIG. 5 does not indicate generation of a new arc, and the dictionary of FIG. 5 does not include any other generation rule subsequent to the rule (5). Accordingly, the generation of the sub-network of "he" which starts with AGENT ends with the rule (5). The process returns from the processing of the sub-network to the processing of the node "go".

For the processing of the node "go", the rules (2) et seq. of the generation rules of the intransitive verb of FIG. 5 are examined in sequence. None of the generation rules (2), (3) and (4) is applied to this processing because of the structure of the node "go". Since the arc "PAST" which represents the past tense extends out of the node "go", the rule (5) is applied. By the application of the rule (5), the past form "went" of "go" is output. Neither of the rules (6) and (7) is applied. The process proceeds to the rule (8), according to which the processing of the out arc "GOAL" is executed. Since the type of this arc is an out arc, generation of a phrase corresponding to the subnetwork starting with GOAL is started. This phrase generation process follows steps similar to those explained in connection with the out arc AGENT. When the preposition "to" is selected in accordance with the arc GOAL, it is examined whether or not "go" and "Kobe" cooccur with each other via "to". In this manner, "to Kobe" is generated from this sub-network.

Then, according to the rule (9), generation of a phrase corresponding to a sub-network starting with INST is performed, so that "by bus" is generated. Finally, a period (.) is generated in accordance with the in-arc ST, whereby all the processing associated with the node "go" is completed. In this manner, the sentence generation is completed and the English sentence "He went to Kobe by bus." is obtained.

Another conventional sentence structure generating process is described in "Generation of English Sentence from Conceptually Dependent Diagram", 5L-3 of the 28th national meeting of the Institute of Electronics, Information and Communication Engineers. In this conventional sentence structure generating process, a phrase structure is generated from a semantic network by using the following grammatical rules based on improved phrase structure rules.

1. S (NP(A) VP(V*) NP(O))
2. S (NP(A) VP(V*) INF2(O))
3. S (NP(A) VP(V(*) NP(R) NP(O)))

These grammatical rules expressed as $\alpha(\beta 1 \ldots \beta n)$ will be explained in brief. $\alpha(\beta 1 \ldots \beta n)$ is a phrase structure rule for converting $\alpha$ into the sequence $\beta 1 \ldots \beta n$. In the above grammatical rules, "NP" represents a nominal phrase, "VP" a verbal phrase, "A" an agentive case, "O" an objective case, "R" a recipient case, "*" a predicate. In the above expression method, each phrase structure rule and the corresponding case information (semantic information) are described in the same part. In other words, each phrase and its meaning are described in pair in the same part.

However, the above-described conventional natural language processing systems explained in connection with FIGS. 4, 5 and so on, that is, the natural language processing systems of the type which is not provided with a sentence structure generation process, generate a sentence from a semantic network by searching a dictionary by referring to a node name as a key word while following the semantic network, activating the sentence generation rules associated with the desired word, which are stored in a sentence generation rule storage portion, and generating a translated sentence. In this process, as the scale of generation rules increases, it becomes more difficult for operators other than one who creates the sentence generation rules to understand the structure of the sentence generation rules. In addition, the maintenance required to alter the rules becomes more difficult and expandability is limited.

Moreover, the following problems are pointed out. In the above generation systems, the sequence of application of the generation rules determines the order of words. It follows that no grammar (phrase structure rules) appears explicitly. It is therefore impossible to ensure that a generated sentence matches grammar.

The conventional sentence structure generation system provided with the above-described sentence structure generation process involves a number of problems. For example, since case information representing semantic information needs to be mixed with phrase structure rules representing sentence structure rules, it is necessary to write a plurality of identical phrase structure rules in the following manner.

1. S(NP (A) VP(V(*) NP(R) NP(O)))
   I give him a book.
2. S(NP (A) VP(V(*) NP(0) NP(C)))
   I call him a scholar.

C is a content determiner case.

SUMMARY OF THE INVENTION

It is a primary object of the present invention to solve the above-described problems.

It is another object of the present invention to provide a sentence structure generating device which enables a description of grammatical rules based on a clear construction and which excels in, for example, maintainability and expandability.

It is another object of the present invention to provide a sentence structure generating device which can assure the grammatical correctness of a generated sentence.

It is another object of the present invention to provide a sentence structure generating device which can describe analysis and generation, which have heretofore been separately described, in a similar manner by means of unification grammar.

To achieve the above objects, according to the present invention, there is provided a natural language sentence generating device which comprises: grammatical rule storing means for storing a plurality of grammatical rules each including a phrase structure part in which a phrase structure rule is described, a semantic part in which is described the manner of propagation of attribute information from a particular superordinate category to a subordinate category, a condition part in which an applying condition for the grammatical rule is described, and a message part in which is described a message for imposing limitations on a phrase structure rule utilizing the subordinate category as a new superordinate category; searching means for searching the grammatical rules stored in the grammatical rule storing means in accordance with the manner of propagation; interpreting means for interpreting the grammatical rules stored in the grammatical rule storing means; and generating means for applying a particular grammatical rule which is extracted from the grammatical rule storing means by the searching means while interpreting the particular grammatical rule through the interpreting means, thereby generating a phrase structure from a set of information on a grammatical function imparted to the particular grammatical rule.

With the generation apparatus having the above-described arrangement, it is possible to achieve a remarkably simple, systematic generation method of generating a phrase structure tree (phrase structure) by the single principle of "propagation of attribute information" from a higher-order node to a lower-order node along the phrase structure tree.

In one preferred form of the present invention, the apparatus further comprises input means for inputting a sentence to which the grammatical rule is to be applied by the generating means, and the sentence has a conceptual structure which is described by using a feature description rule in lexical functional grammar.

In another preferred form of the present invention, the grammatical rule stored in the grammatical rule storing means is described by using the feature description rule.

In another preferred form of the present invention, the conceptual structure of the sentence input by the input means is a feature structure into which a semantic network is converted.

In another preferred form of the present invention, the apparatus further comprises input means for inputting a sentence to which the grammatical rule is to be applied by the generating means, and the sentence has a conceptual structure which is described by using a feature description rule in lexical functional grammar, and the conceptual structure of the sentence input by the input means is a feature structure into which a semantic network is converted.

In another preferred form of the present invention, the apparatus further comprises analysis means for analyzing the input sentence in accordance with unification grammar and output the resulting feature structure. The aforesaid generating means includes recursive call means for executing a program which can be recursively called and the conceptual structure of the sentence input by the input means is the feature structure.

The above arrangement enables analysis and generation which have heretofore been separated to be described in a similar manner by means of unification grammar.

In another preferred form of the present invention, the phrase structure part includes a phrase as a category, the phrase structure part comprising a superordinate category and at least one subordinate category constituting the superordinate category.

In another preferred form of the present invention, the attribute information propagated to the subordinate category is the feature structure of the superordinate category.

In another preferred form of the present invention, the attribute information propagated to the subordinate category is the the feature structure of the superordinate category.

In another preferred form of the present invention, if the message described in the message part is propagated from the superordinate category to the subordinate category, the searching means selects at least the message and, as a subordinate category, a category which matches the applying condition described in the condition part.

In another preferred form of the present invention, the applying condition which is described in the condition part is the type of verb or the type of clause.

Other objects and advantages besides those discussed above shall be apparent to those skilled in the art from the description of preferred embodiments of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a diagram showing one example of the semantic network used in the conventional system of FIG. 2;

FIG. 5 is a view showing the generation rules used in the conventional system;

FIG. 6A is a view showing one example of the phrase structure rules used for explaining LFG (lexical functional grammar) for use in the embodiment of the present invention;

FIG. 6B is a diagram showing the phrase structure rules of FIG. 6A as a C-structure;

FIG. 6C is a diagram showing an F-structure obtained from the phrase structure rules of FIG. 6A;

FIG. 7 is a diagram showing one example of the grammatical rules used in LFG;

FIG. 8 is a diagram showing one example of the entries of a dictionary for use with LFG;

FIGS. 10-13 are diagrams which serve to illustrate a process for generating a sentence "the boy who I saw is John." in the first embodiment; FIG. 10 being a diagram showing an F-structure for generating such sentence, FIG. 11 being a diagram showing a phrase structure which will be finally obtained, FIG. 12 being a diagram showing grammatical rules for use in the generation process, and FIG. 13 being a diagram showing a corresponding semantic network;

FIGS. 14-17 are diagrams which serve to illustrate a process for generating a sentence "I stop at Kobe to rest." in the second embodiment; FIG. 14 being a diagram showing the semantic network of such sentence, FIG. 15 being a diagram showing an F-structure for generating the sentence, and FIG. 16 being a diagram showing a phrase structure which will be finally obtained; and FIGS. 18A and 18B are flowcharts showing the sequence of a generation process according to the second embodiment.

DESCRIPTION OF THE PREFERRED EMBODIMENTS

Figure 1:
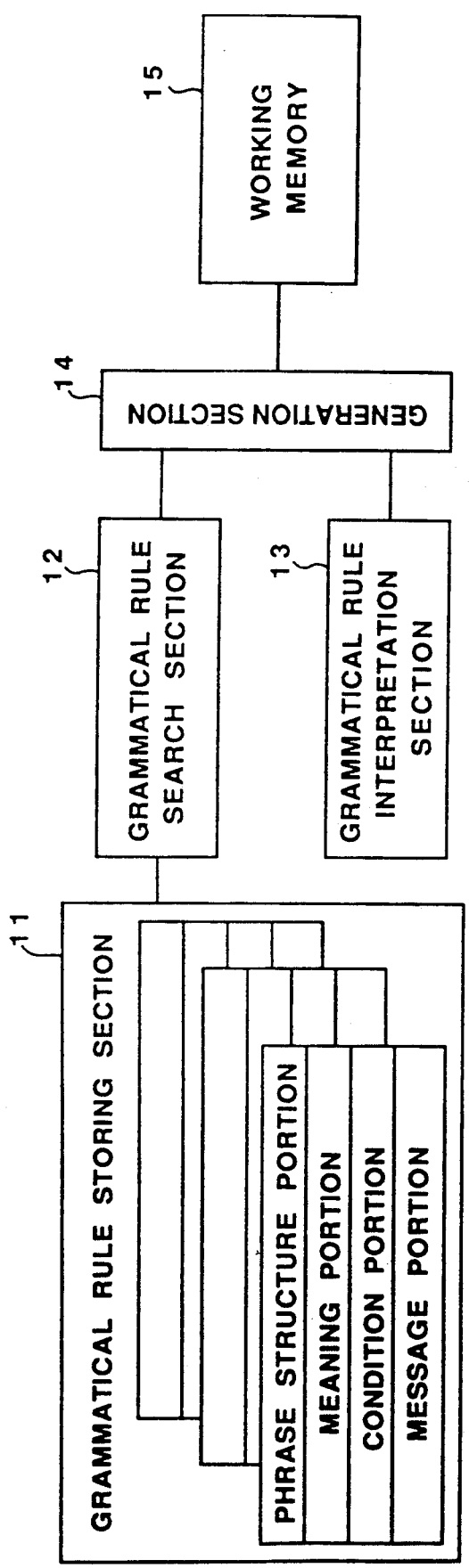
FIG. 1 is a block diagram showing a sentence structure generating device according to an embodiment of the present invention.
Figure 2:
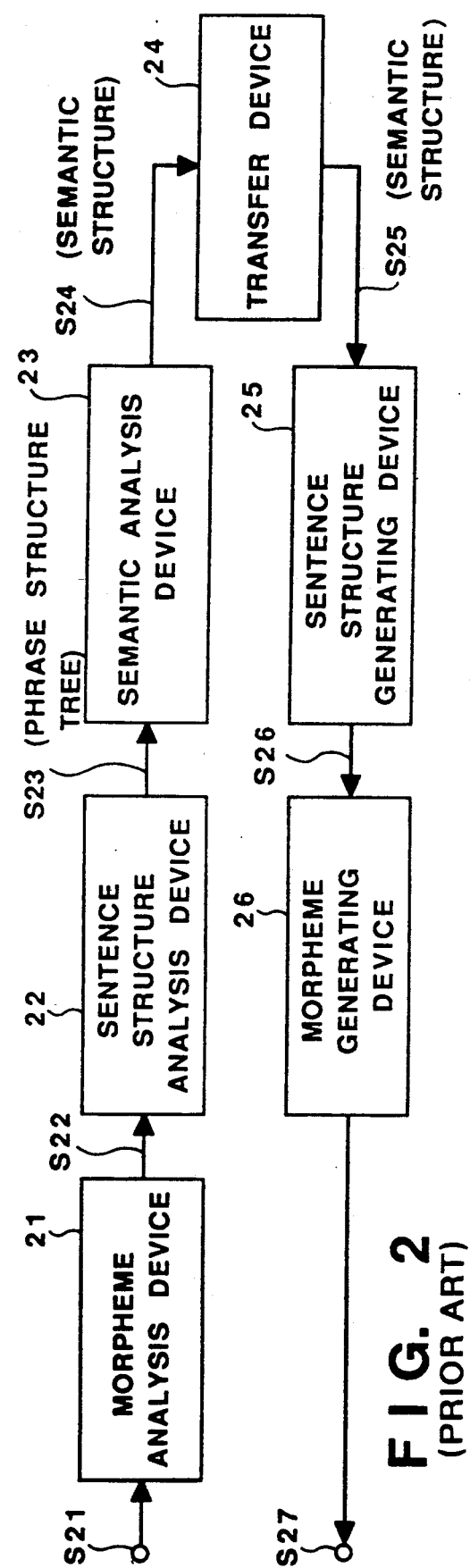
FIG. 2 is a block diagram showing a machine translation system according to a prior art.
Figure 3:
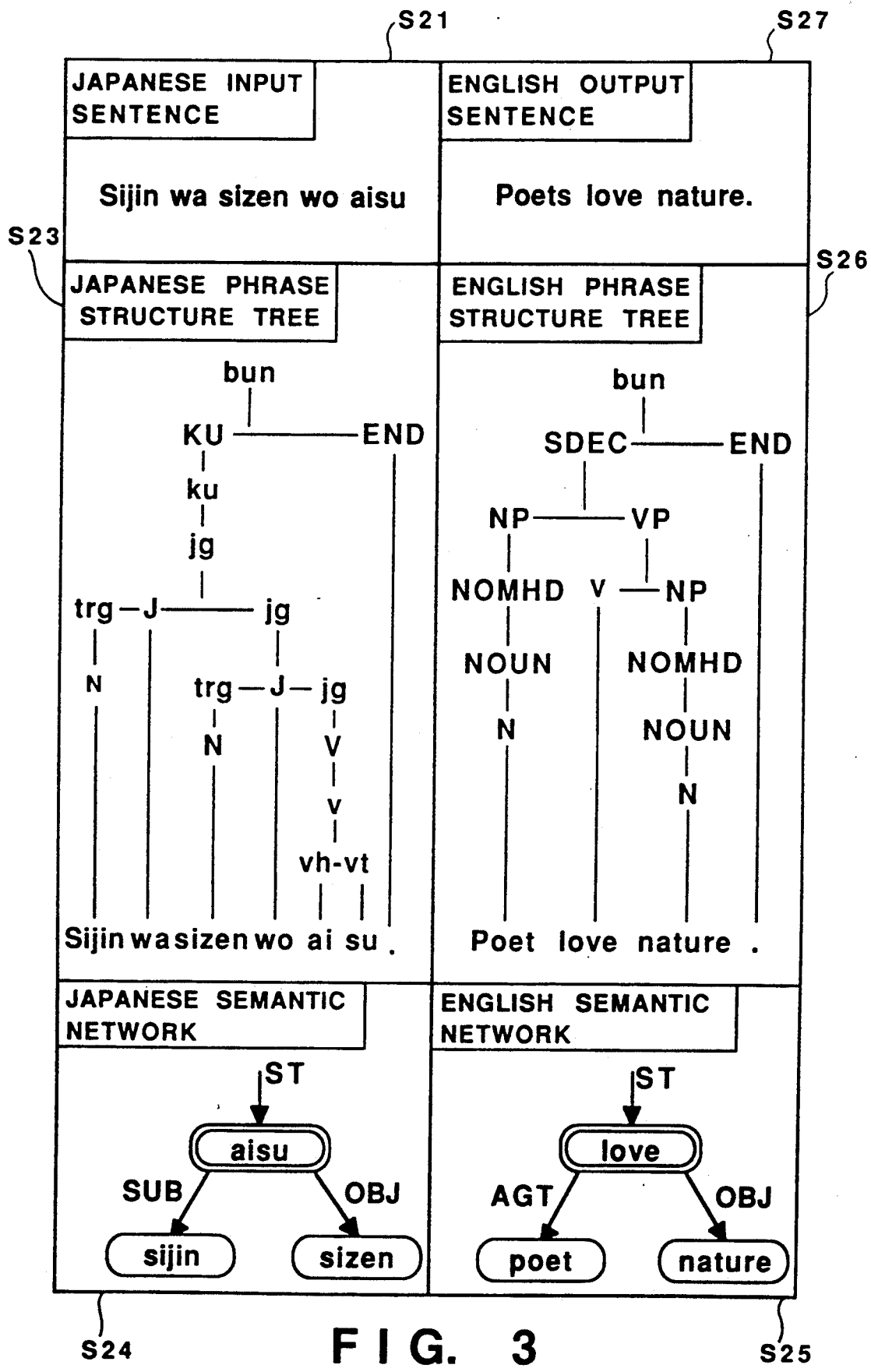
FIG. 3 is a view showing the sequence of translation in the system of FIG. 2 as an array of window screens.

Two embodiments (first and second embodiments) in which a natural language generation method according to the present invention is applied to unification grammar will be explained below with reference to the accompanying drawings. Before these embodiments are explained, the unification grammar to which the present invention can be effectively applied will be explained below.

<UNIFICATION GRAMMAR>

The term "feature" is a key word in the following explanation. Each feature includes a feature name and a feature value and represents a grammatical function. Simple examples of the feature names are "subject" ("SUBJ"), "object" ("OBJ"), "gender" ("GENDER"), and "number" ("NUMBER"), "case" ("CASE") and so on.

The sentence structure generating device according to the present invention receives as its input a feature structure which represents a feature as an element and outputs a corresponding phrase structure. It will be apparent that the introduction of the feature structure makes it possible to describe the analysis of sentence structure and the generation of sentence structure, both of which have heretofore been separately performed, in the same manner by means of the unification grammar.

The unification grammar describes grammar by using features and represents the relations between constituent elements of a sentence as the unification of the features, as described in (1) Schieber: An Introduction to Unification-Based approaches to Grammar, CSLI Lecture Notes Nov. 4. 1986 and (2) Nomura: Fundamental Technique of Natural Language Processing, compiled by the Institute of Electronics, Information and Communication Engineers and published by Corona-sha (1988). The unification is one kind of sum-set operation.

The following is an explanation of grammar (unification analysis) for analyzing the structure of a sentence by means of unification operation using unification grammar. Although there are several kinds of unification grammar, lexical functional grammar (LFG) will be referred to in the following explanation.

LFG uses as its grammatical rules phrase structure rules to which are added grammatical functions. The sentence structure of a sentence is represented by two hierarchies: a C-structure representing a phrase structure tree and an F-structure representing the hierarchical structure of grammatical function.

C-structure (constituent structure) is a structure tree itself. The C-structure represents as an analysis tree obtained by performing normal sentence analysis by using the phrase structure rules contained in the LFG grammatical rules. The F-structure (functional structure) is a feature structure in which the relations between the grammatical functions described in the grammatical rules are hierarchically represented in correspondence with the sentence structure represented by the C-structure. The C-structure is used in the process of obtaining the F-structure. Accordingly, the analysis result in LFG is represented with the F-structure. For example, if each phrase structure rule ER shown in FIG. 6A is used as the phrase structure rule of the grammatical rules, the C-structure of the sentence "He sees tables." is as shown in FIG. 6B. The F-structure which results from the analysis of LFG corresponding to the C-structure is, for example, as shown in FIG. 6C.

In brief, the F-structure (feature structure) shown in FIG. 6C is as follows. The subject "SUB" has a singular form and is represented as "NUM SG". Since the subject has the third person, the person is represented as "PERS 3". The gender of the subject is represented as "GEN MASC" because of its male gender. Since the subject has a nominative case, the case is represented as "CASE NOM". Since the content (predicate) of the subject is "HE", the predicate is represented as "PRED HE". Since the tense of this sentence is the present tense, it is represented as "TENSE PRES". The predicate is represented as "SEES <(SUB)(OBJ)>". The predicative portion (predicate) of this sentence is "SEES" and accompanies a predicate and an object. Therefore, "SEES" is represented as "SEES<(SUB)-(OBJ)>". Also, the object "OBJ" has a plural form and is represented as "NUM PL". Its content (predicate) is "TABLE" and is represented as "PRED TABLE".

In the foregoing, "SUB", "OBJ", "NUM" and so on serve individual grammatical functions. There are two kinds of feature values: One takes a primitive value and the other takes the F-structure. The feature values of the kind which takes the primitive value are, for example, the feature values "SG" and "PL" relative to the feature "NUM". The feature values of the kind which takes the F-structure are, for example, feature values relative to the features "SUB" and "OBJ".

The grammatical rules of LFG will be explained below.

The grammatical rules of LFG are represented by phrase structure rules and the grammatical functions of non-terminal symbols appearing in the phrase structure rules. The grammatical functions are represented in a form called a functional schema using metavariables. The grammatical rules of LFG are represented as, for instance, the six examples (LR1 to LR6) shown in FIG. 7.

Of the six examples of FIG. 7, for example, LR1 (S→NP VP) is a phrase structure rule. The rule LR1 indicates that the sentence S includes a nominal phrase NP and a verbal phrase VP. The expression attached to the bottom of the non-terminal symbol of each phrase structure rule on the right side is called a functional schema (for example, "(↑SUBJ)= ↓" or "↑ = ↓"). An upward arrow and a downward arrow in each functional schema are called metavariables. In other words, the grammatical rules of LFG include the phrase structure rules and the functional schemas. The terminal symbols are literal terms (for example, the above-described "he") which appear in the final process of phrase generation, and non-terminal symbols are symbols other than terminal symbols. Specifically, in S→Np VP, NP and VP are the non-terminal symbols.

The metavariable ↑ indicates an F-structure which corresponds to the non-terminal symbol ("S" in the example LR1) on the left side of each phrase structure rule, that is to say, the F-structure of a superordinate node in a phrase structure tree corresponding to the phrase structure rule. For example, (↑SUB) indicates that NP to which (↑SUB) is attached is SUB of the superordinate node S in the F-structure of the superordinate node S. The metavariable ↓ indicates an F-structure which corresponds to a non-terminal symbol to which the functional schema is attached, that is to say, the F-structure of the subordinate node (or node N of FIG. 6B) of a phrase structure tree (for example, FIG. 6B) corresponding to the phrase structure rule. The non-terminal symbol in parentheses may be omitted in each phrase structure rule. For example, in the rule LR2, the nominal phrase NP or the prepositional phrase PP may be omitted. Each element marked by * may or may not appear. The number of elements may be one or more, and the order of appearance does not matter. For example, in the rule LR3, the prepositional phrase PP may appear by a plurality of times. If a plurality of elements marked by * appear, the respective elements are handled independently. In other words, the elements have independent F-structure.

LR1 in FIG. 7 corresponds to the phrase structure rule ER1 of FIG. 6A. LR1 indicates that the nominal phrase NP and the verbal phrase VP are arranged in that order in the sentence S, and each non-terminal symbol indicates that the condition shown by the functional schema attached to the non-terminal schema must be satisfied.

The first term of LR1 on the right side $$\text{NP} \atop (\uparrow \text{SUB}) = \downarrow$$

reads "F-structure of NP is shifted to the portion of SUB of the F-structure of the superordinate node." In other words, it is indicated that the F-structure of the nominal phrase is the F-structure of the subject SUB of the sentence S. Accordingly, it is indicated that the grammatical function of the subject of the sentence is the grammatical function performed by NP in the phrase structure rule of LR1.

The second term of LR1 on the right side $$\text{VP} \atop \uparrow = \downarrow$$

reads "F-structure of VP is shifted to the F-structure of the superordinate node." The functional schema ↑ = ↓ indicates that, in the subordinate nodes of the phrase structure rule on the right side, a node accompanying that functional schema is a head.

The following is an explanation of expressions used for vocabulary entries in a dictionary employing the techniques of LFG.

The vocabulary entries of the dictionary are represented by using the functional schemas, as in the case of the above-described grammatical rules. The metavariable ↑ of the functional schemas refers to the F-structure of a superordinate node, as in the case of the grammatical rules described above. The superordinate nodes of the vocabulary entries always represent pre-terminal symbols, respectively. The metavariable ↑ refers to the F-structure of a superordinate node, as in the case of the grammatical rules described above. The superordinate node of each vocabulary entry is always a pre-terminal symbol. The pre-terminal symbol means a symbol which specifies a part of speech immediately before a terminal symbol, while the terminal symbol the last literal term. For example, in the example LD1 of FIG. 8, V is a pre-terminal symbol. Examples of the vocabulary entries are shown in FIG. 8.

In the example LD1 of FIG. 8, the features "TENSE", "NUM" and "PERS" indicate tense, number and person, respectively. The feature values "SG", "PL" and "3" indicate "singular number", "plural number" and "third person", respectively. In the example LD1, "V" indicates that "sees" is a verb. "(↑TENSE)=PRES" indicates that the verb "sees" has a present form. In addition, "(↑SUB NUM)=SG" and "(↑SUB PERS)=3" indicate that the subject must be the third person singular. The value of the feature "PRED" is put in the symbol ' ' and the portion put in ' ' is called a semantic form. The semantic form gives the information required to interpret the meaning of the corresponding entry.

The grammatical rules and the dictionary of LFG are as described above. The following is an explanation of a sentence analysis method using LFG.

The sentence analysis is performed by two steps: formation of a C-structure and formation of an F-structure. The formation of a C-structure is accomplished by ordinary sentence structure analysis employing phrase structure rules in the grammatical rules (those shown in, for example, FIG. 7) and parts of speech in the dictionary (that shown in, for example, FIG. 8). NO functional schema is used.

When the C-structure is formed, an F-structure is obtained from the C-structure by using the functional schema. In this case, an operation called unification is utilized.

It is assumed that the C-structure such as that shown in FIG. 6B is obtained. From the example LD1 of FIG. 8, the corresponding F-structure of "V" is $$\begin{bmatrix} SUBJ & \begin{bmatrix} NUM & SG \\ PERS & 3 \end{bmatrix} \\ TENSE & PRES \\ PRED & \text{'SEES}<(\uparrow SUBJ)(\uparrow OBJ)>\text{'} \end{bmatrix}$$

From the example LD3 of FIG. 8, an F-structure corresponding to "table" is

FS2:

$$\begin{bmatrix} NUM & PL \\ PRED & \text{"TABLE"} \end{bmatrix}$$

The grammatical rule LR2 is $$VP \rightarrow V \quad (NP) \quad (PP)$$
$$(\uparrow OBJ) = \downarrow \quad (\uparrow(\downarrow PCASE)) = \downarrow$$

The functional schema $(\uparrow OBJ) = \downarrow$ of NP means that the F-structure of NP is shifted to the OBJ NO portion of the F-structure of the superordinate node VP.

Accordingly, the F-structure FS3 of VP is $$\begin{bmatrix} SUBJ & \begin{bmatrix} NUM & SG \\ PERS & 3 \end{bmatrix} \\ TENSE & PRES \\ PRED & \text{'SEES}<(\uparrow SUBJ)(\uparrow OBJ)>\text{'} \\ OBJ & \begin{bmatrix} NUM & PL \\ PRED & \text{"TABLE"} \end{bmatrix} \end{bmatrix}$$

In the process of obtaining FS3, the fact that unification is one kind of sum-set operation is employed.

As described above, the unification is the operation of assembling the F-structure FS1 of V and the F-structure FS2 of NP into a higher-order F-structure FS3 in accordance with the functional schema of the grammatical rule LR2.

The unification processing is not only one kind of sumset operation but the operation of checking consistency. The operation of checking consistency will be explained below.

From LD2, the F-structure of NP corresponding to "he" is FS4:

FS4:

$$\begin{bmatrix} NUM & SG \\ PRES & 3 \\ GEN & MASC \\ CASE & NOM \\ PRED & \text{"HE"} \end{bmatrix}$$

The grammatical rule LR1 is:

$$S \rightarrow \quad NP \quad VP$$
$$(\uparrow SUBJ) = \downarrow \quad \uparrow = \downarrow$$

Therefore, the F-structure FS5 of S is:

$$\begin{bmatrix} SUBJ & \begin{bmatrix} NUM & SG \\ PERS & 3 \\ GEN & MASC \\ CASE & NOM \\ PRED & \text{"HE"} \end{bmatrix} \\ TENSE & PRES \\ PRED & \\ OBJ & \begin{bmatrix} NUM & PL \\ PRED & \text{"TABLE"} \end{bmatrix} \end{bmatrix}$$

It is demonstrated here that it is possible to check the consistency of the above "he". [NUM SG] and [PERS 3] in the F-structure of NP are consistent with [NUM SG] and [PERS 3] in SUB of the F-structure FS3 of the aforesaid VP. It follows therefore that unification analysis is successfully effected.

The thus-obtained F-structure FS5 of the sentence is the semantic structure of the sentence which is finally obtained by the LFG analysis.

The foregoing is an explanation of the unification analysis employing an LFG method. The first and second embodiments of the present invention will be explained below in that order.

(CONSTRUCTION OF APPARATUS)

FIG. 1 is a block diagram showing a sentence structure generating device which is suitable for use with both of the first and second embodiments. The sentence structure generating device is arranged to generate a phrase structure from a feature structure.

The apparatus shown in FIG. 1 comprises a grammatical rule storing section 11 for storing grammatical rules for use in generating sentence structures. Each grammatical rule stored in the grammatical rule storing section 11 includes a phrase structure portion, a semantic portion, a condition portion and a message portion. FIG. 12 shows one example of the grammatical rules. In FIG. 12, "@sem" indicates the semantic portion, "@con" the condition portion and @mes the message portion.

The phrase structure portion describes phrase structure rules such as "SDEC→NP VP" and "VP→V NP". In FIG. 12, SDEC, NP, VP and V indicate a declarative sentence, a nominal phrase, a verbal phrase and a verb, respectively, and these elements are called grammatical categories.

The semantic portion describes the manner of propagating feature information from a superordinate category (the grammatical category of the phrase structure rule on the left side thereof) to a subordinate category (the grammatical category of the phrase structure on the phrase structure rule on the right side thereof). The condition portion describes the information required to describe the applying conditions for a corresponding grammatical rule. The message portion describes rules for imposing limitations on the application of a grammatical rule using the subordinate category of the grammar as a superordinate category.

The device shown in FIG. 1 also comprises a grammatical rule search section 12, a grammatical rule interpretation section 13, a generation section 14 and a working memory 15. The grammatical rule interpretation section 13 interprets a grammatical rule which has been searched in the grammatical rule storing section 11 by the grammatical rule search section 12. The generation section 14 generates phrase structures by utilizing grammatical rules and control of the input/output of information of various kinds. A feature structure representing the meaning of a sentence is initially set in the working memory 15 (serving as a working area) and a phrase structure is constructed on the working memory 15 on the basis of the feature structure.

Figure 9:
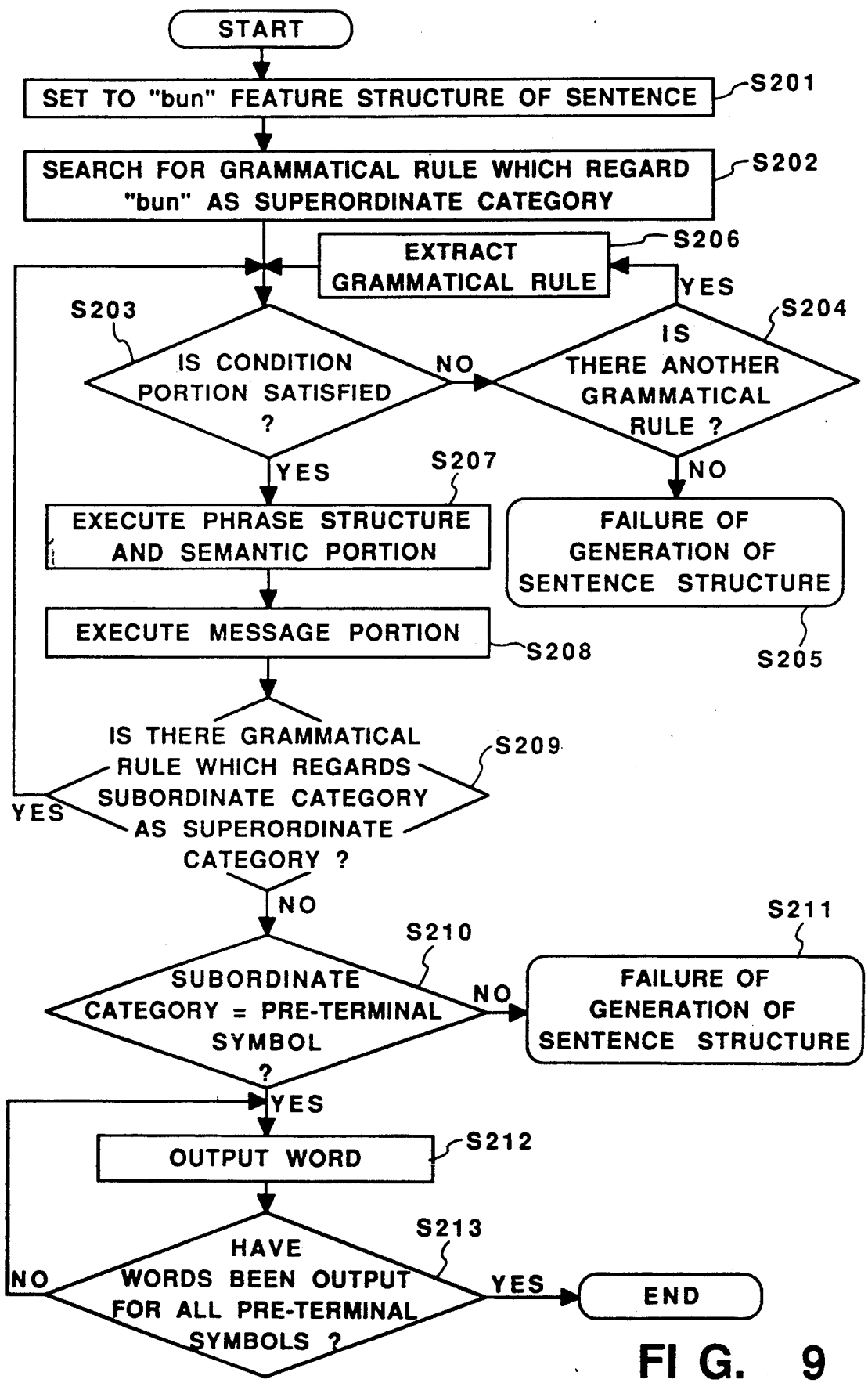
FIG. 9 is a flowchart showing a sentence structure generating process according to a first embodiment of the present invention.
Figure 18B:
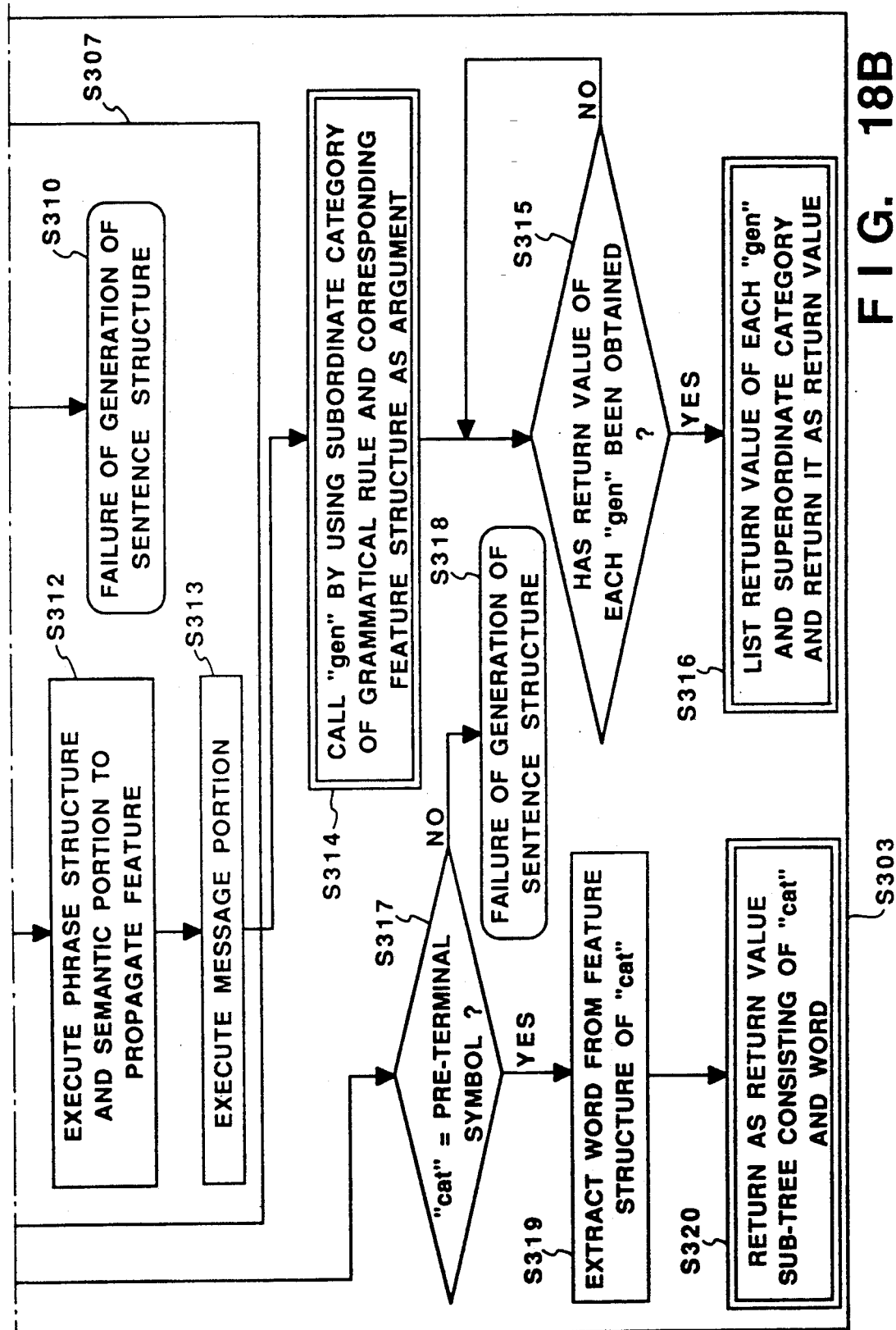

The foregoing is an explanation of the construction of the device according to both of the first and second embodiments. Then, sentence structure generation processes according to the first and second embodiments will be explained in that order. The sentence structure generation process according to the first embodiment utilizes a semantic network as an aid, and the procedure is shown in the flowchart of FIG. 9. The sentence structure generation process according to the second embodiment utilizes a recursive procedure employing a semantic network, and the procedure is shown in the flowcharts of FIGS. 18A and 18B.

(FIRST EMBODIMENT)

FIG. 9 is a flowchart of the sentence structure generation process according to the first embodiment, which is suitable for use in the sentence structure generating device of FIG. 1 according to the first embodiment. In the following explanation referring to the flowchart of FIG. 9, Example 1 refers to the process of receiving a feature structure such as that shown in FIG. 10 and outputting a phrase structure such as that shown in FIG. 11 with reference to the grammatical rule shown in FIG. 12, and Example 2 refers to the process of receiving a feature structures such as that shown in FIG. 15 and outputting a phrase structure such as that shown in FIG. 17 with reference to the grammatical rule shown in FIG. 16.

CONTROL PROCEDURE

The entire process will be explained below with reference to the flowchart of FIG. 9.

Figures 10, 11:
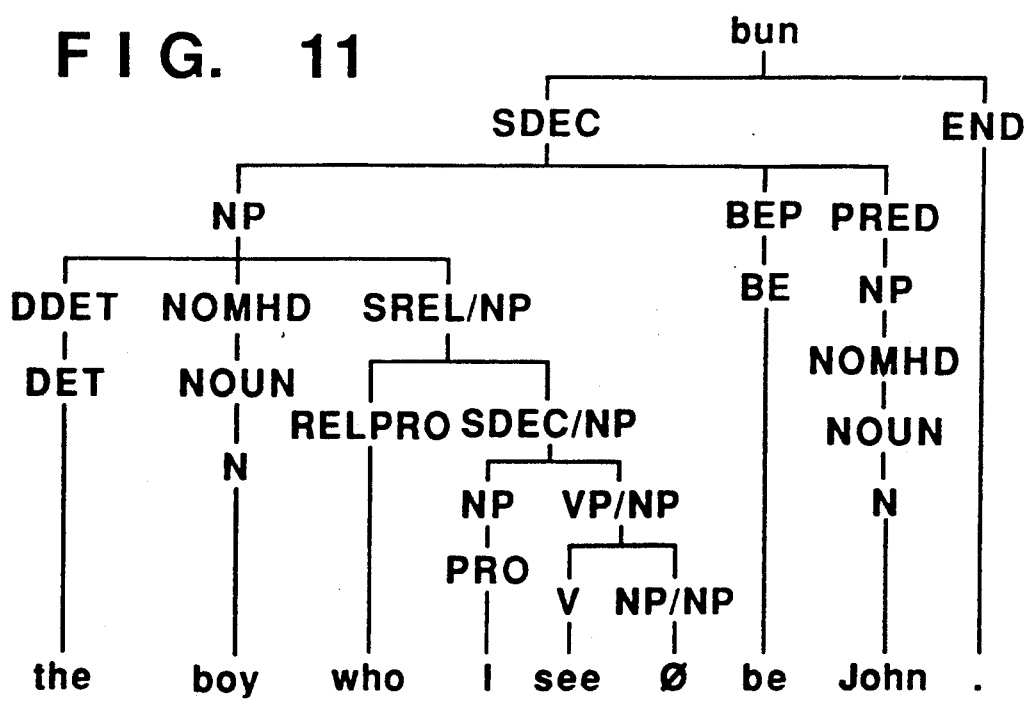

First of all, in Step S201, a feature structure such as that shown in FIG. 10 is set to a grammatical category "bun" ("bun" is a Japanese term which corresponds to a sentence in English) which is located at the uppermost position of a phrase structure tree. Then, in Step S202, the grammatical rule storing section is searched to obtain a grammatical rule which regards "bun" as a superordinate category (a grammatical category on the left side of a phrase structure rule). In the example shown in FIG. 12, the desired rule is shown as a rule R1. In Step S203, a decision is made as to the grammar applying condition described in the condition portion of the obtained grammatical rule. In Step S203, it is determined that this grammar applying condition is not satisfied, and the process proceeds to Step S204, where it is determined whether or not there is another grammatical rule which regards "bun" as a superordinate category. If no such grammatical rule is found, the process proceeds to Step S205, where it is determined that the generation of a sentence structure has failed. If another grammatical rule is found in Step S204, the process proceeds to Step S206, where the grammatical rule is fetched. The process then returns to Step S203, where it is determined whether or not the grammar applying condition described in the condition portion of the grammatical rule is satisfied.

If it is determined in Step S203 that the grammatical rule fetched in Step S202 or S206 is satisfied, the grammatical rule is applied in Step S206 and the process returns to Step S203. In Step S203, it is determined whether or not the grammar applying condition described in the condition portion is satisfied. If it is satisfied, it is possible to apply the grammatical rule.

Then, in Step S207, the phrase structure portion and the semantic portion of the grammatical rule are executed. The phrase structure portion describes a phrase structure rule, and the semantic portion describes the manner of "propagation" of feature information from a superordinate category to a subordinate category. In accordance with the description in the semantic portion, the feature information is propagated from the superordinate category to the subordinate category, whereby information on the sentence is adequately distributed. The process of propagating the feature information from the superordinate category to the subordinate category will be explained later in detail with reference to FIGS. 10 to 12.

In the Step S208, the message portion is executed. This message portion is provided for imposing limitations on the application of a grammatical rule which utilizes as a superordinate category the subordinate category of the grammatical rule fetched in Step S206. More specifically, the message portion is used to control the process of applying a grammatical rule by utilizing the aforesaid condition portion and the message portion.

When one grammatical rule is executed in the foregoing manner, the process proceeds to Step S209 in order to generate a lower-order phrase structure (phrase structure tree). In Step S209, it is determined whether or not there is a grammatical rule which utilizes as a superordinate category the subordinate category of that grammatical rule. If such a grammatical rule is found, the process returns to Step S203, where a decision is made as to the condition portion to see if the grammatical rule is applicable. Subsequently, the above-described process is repeated.

If it is determined in Step S209 that there is no grammatical rule which utilizes the subordinate category as a superordinate category, the process proceeds to Step S210, where it is determined whether or not the subordinate category represents a pre-terminal symbol. The pre-terminal symbol means a grammatical category, such as N or V of FIG. 11, which has no lower-order grammatical category. A symbol whose order is lower than that of the pre-terminal symbol is called a terminal symbol, which corresponds to "the" or "boy" in the example shown in FIG. 11.

If it is determined in Step S210 that the subordinate category represents no pre-terminal symbol, the process proceeds to Step S211, where it is determined that the sentence structure analysis has failed. If it is determined in Step S210 that the subordinate category is the pre-terminal symbol, the process proceeds to Step S212, where the desired word is extracted from the feature information which has been propagated to the pre-terminal symbol. For example, if the pre-terminal symbol is DET with the terminal symbol in the feature information being "the", "the" is extracted and placed under the aforesaid pre-terminal symbol. In Step S213, it is determined whether or not words are determined with respect to all the pre-terminal symbols. If there is any pre-terminal symbol for which a word is not determined, the process returns to Step S212, where a word is determined with respect to the pre-terminal symbol.

EXAMPLE 1

An example in which the sentence structure generation technique according to the first embodiment is applied to a linguistic phenomenon such as a relative clause will be explained below with reference to FIGS. 10-13.

FIG. 12 is a flowchart showing one example of the grammatical rules which are described in the grammatical rule storing section 11. In this example, "@sem" indicates a semantic portion, "@con" a condition portion and "@mes" a message portion. " ↑ " indicates the feature structure of the superordinate category and "=" indicates that feature structures on opposite sides are the same. "−" indicates the deletion of a feature structure. "= =" and "≠" indicate the coincidence and non-coincidence of values, respectively. "+ +" indicates the addition of a message. Referring to grammatical categories, "bun" indicates a sentence, "SDEC" a declarative sentence, "END" a punctuation, "NP" a nominal phrase, "BEP" a BE-verbal phrase, "PRED" a predicate phrase, "VP" a verbal phrase, "DDET" a non-indefinite determiner phrase such as a definite article, "NOMHD" a nominal head, "SREL/NP" a relative clause, "RELPRO" a relative pronoun and "V" a verb. Details of the grammatical rules will be explained later during the process of explaining the processing executed by the present sentence structure generating device.

FIG. 13 is a schematic diagram showing a semantic network which corresponds to "The boy who I saw is John.".

FIG. 10 is a diagram showing a feature structure which represents "The boy who I saw is John." As shown in FIG. 10, the feature structure is a set including pairs of a feature name and a feature value. As described above, there are two kinds of feature values: one assumes a primitive value and the other assumes an F-structure. In FIG. 10, [1] in, for example, head [1] indicates the link of the feature structure. The feature structure of FIG. 10 is obtained by conversion of the semantic network of FIG. 13. This conversion is performed with reference to an English dictionary.

The process in which the sentence structure generating device of the first embodiment generates the phrase structure of FIG. 11 from the feature structure of FIG. 10 will be explained below in detail with reference to the flowchart of FIG. 9. Incidentally, a grammatical rule associated with this process is as shown in FIG. 12.

First of all, the feature structure of FIG. 10 is set as "bun" (Step S201) to start generation of a sentence structure. The grammatical rule storing section 11 is searched to obtain a grammatical rule which utilizes "bun" as a superordinate category (Step S202), and the grammatical rule R1 whose structure is described as "bun"→SDEC END is found. Since R1 does not include a condition portion, a phrase structure portion, a semantic portion and a message portion are executed in Steps S207 and S208. The semantic portion is @sem ↑ =SDEC, the feature structure of "bun" is directly propagated to "SDEC". Then, the subordinate category of "bun" is searched to find a rule R2. Subsequently, Steps S203–S208 are repeated.

The grammatical code of the main verb of "SDEC" is Wv1 and matches the condition portion of R2, whereby R2 is applied. "(↑ head syn)= =Wv1" placed in the condition portion of R2 indicates that the feature value of the feature name "syn" in the feature structure of the feature name "head" in the feature structure of SDEC is Wv1. The feature name "syn" is an abbreviation of a syntax code. Wv1 is a grammatical code used in "Longman Dictionary of Contemporary English" and indicates a BE-verb.

In the rule R2, the description "(↑ subcat SUB)=NP" in the semantic portion is particularly important. In accordance with such description, the feature structure of the feature name "SUB" in the feature structure of the feature name "subcat" in the feature structure of the superordinate is propagated to NP. "Subcat" is an abbreviation of subcategorization, and serves to bundle elements having a grammatically strong connection with a main verb (a BE-verb in this case).

The message portion of R2 includes the message description "(NP rel)→NP+ +SREL. This description indicates that, if NP generated in R2 has a relative clause (rel), the massage "SREL" is added to NP. Since the example of FIG. 10 includes a relative clause, SREL is added to NP.

Since the message "SREL" matches the condition portion of R4, R4 is applied. The grammatical category "SREL/NP" in the phrase structure portion of R4 indicates a relative clause. "/" is called a slash and represents information on omission. For example, /NP indicates that NP is omitted in the relative clause "SREL".

Then, R5 is applied to the grammatical category "SREL/NP". According to the description "(↑ relpro)=RELPRO" in R5, the feature structure of the feature name "relpro" in the feature structure of the superordinate category "SREL/NP" is propagated to the relative pronoun RELPRO. Also, according to the description " ↑ −(↑ relpro)=SDEC in the semantic portion in R5, a feature structure in which the feature structure of relpro is deleted from the feature structure of SREL/NP is propagated to SDEC. In the above notation, "−" means omission of a feature structure. Since the grammatical code of this declarative sentence SDEC is T1, not R2 but R3 is searched as a subordinate category. SDEC leads to R6 via R3.

The omission information ."/NP" is incorporated in the feature structure as a slash feature and is automatically sent according to the propagation of the feature. When this information is set to NP, φ(null) is output.

The phrase structure finally obtained is shown in FIG. 11.

EXAMPLE 2

Example 1 has been explained in conjunction with FIGS. 10–13 with reference to the linguistic phenomenon of a relative clause. However, the present invention can be applied to a wide variety of linguistic phenomena. The following is an explanation, referring to Example 2, of the processing of free cases which are related to a decision as to an adequate order of words which plays an important role in generation of a sentence structure.

The feature structure of Example 2 is, as shown in FIG. 15, obtained from a semantic network corresponding to "I stop at Kobe to rest." of FIG. 14. Grammatical rules which are associated with the processing of the feature structure of FIG. 15 is shown in FIG. 16.

The processing of the free cases will be explained. The free cases include a purpose case (PUR), a space case (SPA), a cause case, a condition case and so on. "Stop" which will be explained below involve free case elements such as the purpose case PUR and the space case SPA. Among the free cases, since preference is given to the processing of the purpose case, the cause case, the condition case or the like, the processing of the objective case PUR is initially executed in this example.

Figures 16, 17:
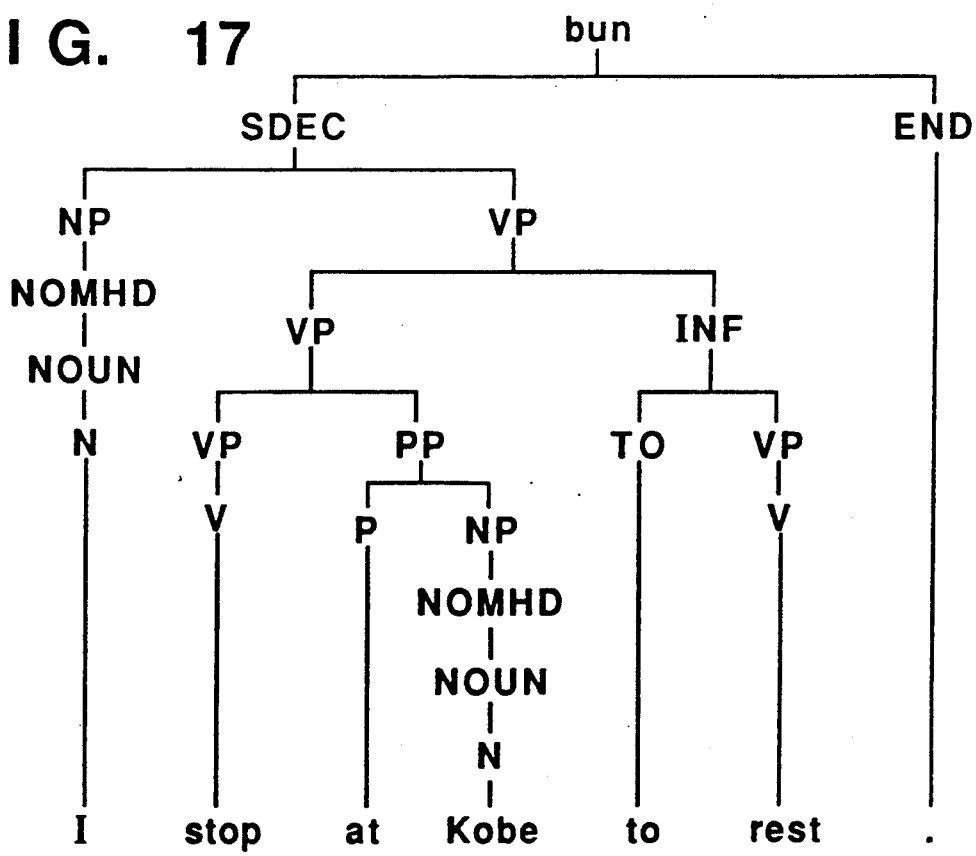

The preferred processing is performed by means of the message portion of the rule R1 of FIG. 16. Specifically, in accordance with (VP ob1 PUR head pos))==v→VP++INF, if a purpose case element is a verb, INF which indicates an infinitive phrase is attached to VP as a message. In this case, since the condition portion of R3 of FIG. 16 requires a message PP indicating a prepositional phrase PP, R3 is not applied and R2 requiring INF is applied. Ob1 placed in the message portion of R1 is an abbreviation of oblique and a feature name which is given the meaning of bundling arbitrary elements.

(VP ob1)→VP++PP in the message portion of the rule R2 of FIG. 16 indicates that, if VP in a superordinate category has a free case, PP is attached to VP in a subordinate category as a message. Accordingly, R3 is applied to VP. (↑ob1 *x)=PP in the semantic portion of R3 indicates that, if VP has a free case, one particular feature structure is regarded as the feature structure of PP. In this description, the variable *x represents one free case element. In this manner, a space case is generated as a preposition phrase.

FIG. 17 shows a phrase structure which is finally obtained from Example 2.

(SECOND EMBODIMENT)

The sentence structure according to the first embodiment described above has been explained on the assumption that a semantic network is used as a conceptual structure and that the semantic network is converted into the feature structure. However, if an analysis is performed on the basis of the unification grammar which describes grammatical functions by using features and which represents the relationships between the constituent elements of a sentence as the unification of the features, feature structures can be employed as conceptual structures. Accordingly, it is not always necessary to use the method of converting the semantic network into the feature structure.

As the second embodiment of the sentence structure generation process which is performed by the generation section 14, a method of using a feature structure as a conceptual structure will be explained with reference to FIGS. 18A, 18B.

The outline of the processing of the second embodiment will be explained in brief.

In the generation section 14, "gen"-a program for generating a phrase structure tree, plays the primary role.

This program performs recursive processing and generates a structure whose order is lower than that of a particular phrase structure tree by recursively calling "gen" in "gen".

When "gen" calls "gen", a grammatical category and a corresponding feature structure are passed to called "gen" as an argument. The called "gen" tends to generate a sub-tree which utilizes as a superordinate category the grammatical category given as the argument. If this subordinate category (or grammatical category given as the argument) is not a pre-terminal symbol, "gen" is again called by using the subordinate category and a corresponding feature structure as an argument in order to generate a sub-tree whose order is lower than that of the subordinate category. If the subordinate category is a pre-terminal symbol, no lower-order sub-tree will be generated, and the sub-tree whose order is lower than that of the pre-terminal symbol is established. The established sub-tree is used as a return value of "gen" which regards the pre-terminal symbol as an argument.

When the return values (sub-tree) of "gen" utilizing the respective subordinate categories as arguments are returned, a sub-tree is produced by assembling the return values (sub-trees) and a superordinate category, and the sub-tree is set as the return value of "gen" utilizing the superordinate category as an argument.

In this manner, the return value of "gen" utilizing as an argument a top category called "bun", that is, the desired phrase structure tree, is obtained.

The sentence structure generation process according to the second embodiment will be explained in detail below with reference to FIGS. 18A and 18B.

In Step S301, the generation program "gen" is called by utilizing as an argument "bun" which is the top category (highest-order grammatical category) of a phrase structure tree and the feature structure of a sentence. The "gen" denoted by numeral S303 generates a return value by repeating a recursive call in the interior. When the return value of "gen" S303 is obtained, it is set as a value named "TREE" in Step S302 (FIG. 18A). The desired phrase structure tree is thus obtained.

The "gen" S303 is a recursive processing program for generating a phrase structure tree.

First of all, in Step S304, the "gen" S303 sets a grammatical category passed as an argument as a value named "cat" and a feature structure as a value named FS. In Step S305, a grammatical rule utilizing "cat" as a superordinate category is searched for. The grammatical rule search section 12 shown in FIG. 1 is used for that purpose.

In Step S306, it is determined whether or not there is a grammatical rule utilizing "cat" as a superordinate category. If the superordinate category is found, the grammatical rule is applied in Step S307. Step S307 includes Steps S308–S313 and performs a processing similar to that explained in connection with Steps S203–S209. Specifically, before the grammatical rule interpretation section 13 of FIG. 1 applies the grammatical rule, it is determined whether or not the condition portion of the grammatical rule is satisfied. If it is not satisfied, the process proceeds to Step S309, where it is determined whether or not there is another grammatical rule. If there is no other grammatical rule, the process proceeds to Step S310, where it is determined that the generation of a sentence structure has failed. If there is another grammatical rule, it is applied in Step S311.

If it is determined in Step S308 that the condition portion is satisfied, the process proceeds to Step S312, where the phrase structure portion and the semantic portion are executed to propagate a feature. Then, in Step S312, a message portion is executed.

When the application of the grammatical rule is completed in this manner, the process proceeds to Step S314, where "gen" is called by utilizing as an argument each subordinate category of the grammatical rule and a corresponding feature structure. The generation section 14 is characterized by the recursive processing of calling "gen" within "gen" in the above-described manner. In this processing, since there are in general a plurality of subordinate categories, "gen" is repeated by a plurality of times.

In Step S315, it is determined whether or not return values have been obtained from all "gens" that have been recursively called. If the return values of "gens" relative to all the subordinate categories have been obtained, the return values and the superordinate categories are assembled as one list in Step S316 and are returned as the return value of "gen" which utilizes the superordinate category as an argument. This return value is a sub-tree which has a lower order than the superordinate category.

The foregoing explanation has been given on the assumption that it is determined in Step S306 that there is a grammatical rule which utilizes the grammatical category "cat" as the superordinate category. The following is an explanation of a case where it is determined that there is no such grammatical rule.

In this case, the process proceeds to Step S317, where it is determined whether "cat" is a pre-terminal symbol such as V (verb) or N (noun). If it is determined that "cat" is not a pre-terminal symbol, the control proceeds to Step S318, where it is determined that the generation of a sentence structure has failed. If it is determined that "cat" is a pre-terminal symbol, the process proceeds to Step S319, where a word is extracted from the feature structure propagated to "cat". In Step S320, a sub-tree constituted by "cat" and the word is returned as the return value of "gen" which utilizes "cat" as an argument.

As described above, the second embodiment differs from the first embodiment in that, even if a semantic network is not employed, it is possible to generate a phrase structure tree from a feature structure by recursively calling the generation program.

As is apparent from the two embodiments described above, the present invention enables processing based on a clear construction utilizing grammatical rules expressed by declarative descriptions. This is because the present invention accomplishes an remarkably simple, systematic generation method of generating a phrase structure tree (phrase structure) by the single principle of "propagation of a feature" from a higher-order node to a lower-order node along the phrase structure tree. Accordingly, it is possible to achieve a phrase structure tree which excels in maintainability and expandability. It is also possible to reliably generate a sentence which matches grammar.

The sentence structure generating device according to the present invention is arranged to receive as its input a feature structure represented by a feature serving as a constituent element and then to output a phrase structure. Although analysis and generation have heretofore been separately executed, the introduction of such a feature description makes it possible to describe the analysis and the generation in a similar manner within the unification grammar.

In addition, according to the present invention, the problem of the sentence structure generation technique proposed in the above-cited paper "Generation of English Sentence from Conceptually Dependent Diagram", can be solved in the following manner.

For example, it is assumed that in the following phrase structure rules (SDEC→NP VP, VP→V NP NP) expressed by the notation of R3 of FIG. 12, the respective semantic portions are described as below:

```
SDEC → NP VP
  @ sem ( ↑ subcat SUB) = NP
  ↑ - ( ↑ subcat SUB) = VP
  @ con( ↑ head syn) ≠ Wv1
  @ mes (NP rel) → NP + + SREL
VP → V NP NP
  @ sem ( ↑ head) = V
  ( ↑ subcat REC) = NP
  ( ↑ subcat OBJ) = NP
  ( ↑ head) = V
  ( ↑ subcat OBJ) = NP
  ( ↑ subcat COT) = NP
  ( ↑ subcat REC) = NP
  @ con ( ↑ head syn) = = D1;
``` where REC means a recipient case and COT a content-define-case. As described above, in the conventional method, since phrase structure rules and corresponding case information (semantic information) are described in the same part, it is necessary to describe them by using two expressions

S (NP(A) VP(V(*) NP(R) NP(O)))

S (NP(A) VP(V(*) NP(O) NP(C)))

In contrast, according to the present invention, a phrase structure rule and corresponding case information are described in a phrase structure part and a phrase structure part, respectively. Accordingly, the phrase structure rule can be represented by a single description and the clearness of the construction can be remarkably improved.

The present invention is not limited to the above embodiments and various changes and modifications can be made within the spirit and scope of the present invention. Therefore, to apprise the public of the scope of the present invention, the following claims are made.

What is claimed is:

1. A natural language sentence generating apparatus comprising:
   (a) grammatical rule storing means for storing a plurality of grammatical rules, each grammatical rule including:
      (a1) a phrase-structure-part in which is described a phrase structure rule representing a grammatical function;
      (a2) a semantic part describing a manner in which attribute information propagates in the phrase structure rule from a particular superordinate category to a subordinate category;
      (a3) a condition part in which an applying condition for said grammatical rule is described; and
      (a4) a message part in which is described a message for imposing limitations on the phrase structure rule utilizing said subordinate category as a new superordinate category;
   (b) searching means for searching the grammatical rules stored in said grammatical rule storing means in accordance with the manner in which the attribute information propagates in the phrase structure rule;
   (c) interpreting means for interpreting the grammatical rules stored in said grammatical rule storing means; and
   (d) generating means for applying one of the grammatical rules extracted from said grammatical rule storing means by said searching means while interpreting said one of the grammatical rules through said interpreting means to generate a phrase structure for the sentence from a set of information on the grammatical function imparted to said one of the grammatical rules.

2. An apparatus according to claim 1, further comprising input means for inputting a sentence to which said grammatical rule is to be applied by said generating means, said sentence having a conceptual structure which is described by using a feature description rule of unification grammar.

3. An apparatus according to claim 2, wherein said grammatical rule stored in said grammatical rule storing means is described by using said feature description rule.

4. An apparatus according to claim 2, wherein the conceptual structure of said sentence input by said input means is a feature structure into which a semantic network is converted.

5. An apparatus according to claim 4, wherein said attribute information propagated to said subordinate category comprises at least a feature structure of said superordinate category.

6. An apparatus according to claim 2, further comprising analysis means for analyzing said input sentence in accordance with unification grammar and outputting the resulting feature structure, said generating means including recursive call means for executing a program which can be recursively called, the conceptual structure of said sentence input by said input means being said feature structure.

7. An apparatus according to claim 6, wherein said attribute information propagated to said subordinate category comprises at least a feature structure of said superordinate category.

8. An apparatus according to claim 2, wherein said phrase structure-part includes a phrase as a category, said phrase structure-part comprising a superordinate category and at least one subordinate category constituting said superordinate category.

9. An apparatus according to claim 2, wherein if said message described in said message part is propagated from said superordinate category to said subordinate category, said searching means selects at least said message and, as a subordinate category, a category which matches the applying condition described in said condition part.

10. An apparatus according to claim 2, wherein said applying condition which is described in said condition part is the type of verb.

11. An apparatus according to claim 2, wherein said applying condition which is described in said condition part is the type of clause.

12. A natural language sentence generating apparatus composing:
(a) grammatical rule storing means for storing a plurality of grammatical rules, each grammatical rule including:
   (a1) a phrase-structure-part in which is described a phrase structure rule representing a grammatical function; and
   (a2) a semantic part describing a manner in which attribute information propagates in the phrase structure rule from a particular superordinate category to a subordinate category;
(b) searching means for searching the grammatical rules stored in said grammatical rule storing means in accordance with the manner in which the attribute information propagates in the phrase structure rule;
(c) interpreting means for interpreting the grammatical rules stored in said grammatical rule storing means; and
(d) generating means for applying one of the grammatical rules extracted from said grammatical rule storing means by said searching means while interpreting said one of the grammatical rules through said interpreting means to generate a phrase structure for the sentence from a set information on the grammatical function imparted to said one of the grammatical rules.

13. A natural language sentence generating apparatus comprising:
(a) grammatical rule storing means for storing a plurality of grammatical rules, each grammatical rule including:
   (a1) a phrase-structure-part in which is described a phrase structure rule representing a grammatical function; and
   (a2) a semantic part describing a manner in which attribute information propagates in the phrase structure rule from a particular superordinate category to a subordinate category;
   (a3) a condition part in which an applying condition for said grammatical rule is described; and
   (a4) a message part in which is described a message for imposing limitations on the phrase structure rule utilizing said subordinate category as a new superordinate category;
(b) searching means for searching the grammatical rules stored in said grammatical rule storing means in accordance with the manner in which the attribute information propagates in the phrase structure rule;
(c) interpreting means for interpreting the grammatical rules stored in said grammatical rule storing means;
(d) generating means for applying one of the grammatical rules extracted from said grammatical rule storing means by said searching means while interpreting said one of the grammatical rules through said interpreting means to generate a phrase structure for the sentence from a set of information on the grammatical function imparted to said one of the grammatical rules; and
(e) means for constructing a sentence in accordance with the phrase structure generated by the generating means.

14. A method of generating a natural language sentence, comprising the steps of:
(a) storing, in grammatical rule storing means, a plurality of grammatical rules, each grammatical rule including:
   (a1) a phrase-structure-part in which is described a phrase structure rule representing a grammatical function; and
   (a2) a semantic part describing a manner in which attribute information propagates in the phrase structure rule from a particular superordinate category to a subordinate category;
   (a3) a condition part in which an applying condition for said grammatical rule is described; and
   (a4) a message part in which is described a message for imposing limitations on the phrase structure rule utilizing said subordinate category as a new superordinate category;

(b) searching the grammatical rules stored in said grammatical rule storing means in accordance with the manner in which the attribute information propagates in the phrase structure rule;
(c) interpreting the grammatical rules stored in said grammatical rule storing means; and
(d) applying one of the grammatical rules extracted from said grammatical rule storing means while interpreting said one of the grammatical rules to generate a phrase structure for the sentence from a set of information on the grammatical function imparted to said one of the grammatical rules.

* * * * *

UNITED STATES PATENT AND TRADEMARK OFFICE
CERTIFICATE OF CORRECTION

PATENT NO. : 5,101,349
DATED : March 31, 1992
INVENTOR(S) : YOSHIHIRO TOKUUME, ET AL.

Page 1 of 4

It is certified that error appears in the above-identified patent and that said Letters Patent is hereby corrected as shown below:

ON THE TITLE PAGE:

IN [56] REFERENCES CITED

OTHER PUBLICATIONS, Under "Generation of English Sentence ...", "285h" should read --285th--.

COLUMN 1

Line 51, "an" should read --a--.
Line 53, "anal-" should read --analyzes--.
Line 54, "yses" should be deleted.

COLUMN 2

Line 27, "device" should read --devices--.
Line 31, "Multi Language" should read --Multi-Language--.

COLUMN 4

Line 3, "subnetwork" should read --sub-network--.
Line 41, "in pair" should read --in pairs--.

COLUMN 5

Line 7, "NP(0)" should read --NP(O)--.

COLUMN 6

Lines 38 to 41 should be deleted.

COLUMN 7

Line 24, "the" should read --The--.

UNITED STATES PATENT AND TRADEMARK OFFICE
CERTIFICATE OF CORRECTION

PATENT NO. : 5,101,349
DATED : March 31, 1992
INVENTOR(S) : YOSHIHIRO TOKUUME, ET AL.

Page 2 of 4

It is certified that error appears in the above-identified patent and that said Letters Patent is hereby corrected as shown below:

COLUMN 8

Line 9, "Notes" should read --Notes,--.
Line 61, ""TABLE"" should read --"TABLES"-- and
""PRED TABLE"." should read --"PRED TABLES".--.

COLUMN 9

Line 26, "S→Np" should read --S→NP--.
Line 58, "non-terminal schema" should read --non-terminal symbol--.

COLUMN 10

Line 62, "NO" should read --No--.

COLUMN 11

Line 52, "sumset" should read --sum-set--.

COLUMN 12

Line 49, "@mes" should read --"@mes"--.
Line 61, "on" should be deleted.
Line 62, "the phrase structure" should be deleted.

COLUMN 13

Line 17, "Then," should read --Now,--.

UNITED STATES PATENT AND TRADEMARK OFFICE
CERTIFICATE OF CORRECTION

PATENT NO.  : 5,101,349
DATED       : March 31, 1992
INVENTOR(S) : YOSHIHIRO TOKUUME, ET AL.

It is certified that error appears in the above-identified patent and that said Letters Patent is hereby corrected as shown below:

COLUMN 14

Line 26, "the" (first occurrence) should be deleted.

COLUMN 16

Line 22, ""(NP rel)→NP++SREL" should read --"(NP rel)→NP++SREL"--.
Line 40, "↑ -(↑ relpro)=SDEC" should read --"↑ -(↑ relpro)=SDEC"--.

COLUMN 19

Line 42, "an" should read --a--.

COLUMN 21

Line 36, "phrase structure-part" should read --phrase-structure-part--.
Line 37, "phrase structure-part" should read --phrase-structure-part--.
Line 55, "composing:" should read --comprising:--.

UNITED STATES PATENT AND TRADEMARK OFFICE
CERTIFICATE OF CORRECTION

PATENT NO. : 5,101,349
DATED : March 31, 1992
INVENTOR(S) : YOSHIHIRO TOKUUME, ET AL.

It is certified that error appears in the above-identified patent and that said Letters Patent is hereby corrected as shown below:

<u>COLUMN 22</u>

Line 11, "information" should read --of information--.
Line 21, "and" should be deleted.
Line 58, "and" should be deleted.

Signed and Sealed this

Tenth Day of August, 1993

Attest:

MICHAEL K. KIRK

*Attesting Officer*      *Acting Commissioner of Patents and Trademarks*